United States Patent
Benzinger

(10) Patent No.: US 8,321,785 B2
(45) Date of Patent: *Nov. 27, 2012

(54) LEAST-EFFORT VARIABLE LENGTH TEXT REPLACEMENT

(75) Inventor: Ralph Benzinger, Karlsruhe (DE)

(73) Assignee: SAP AG, Walldorf (DE)

(*) Notice: Subject to any disclaimer, the term of this patent is extended or adjusted under 35 U.S.C. 154(b) by 936 days.

This patent is subject to a terminal disclaimer.

(21) Appl. No.: 12/099,506

(22) Filed: Apr. 8, 2008

(65) Prior Publication Data

US 2008/0189607 A1    Aug. 7, 2008

Related U.S. Application Data

(63) Continuation of application No. 11/156,203, filed on Jun. 17, 2005, now Pat. No. 7,409,637.

(51) Int. Cl.
*G06N 3/00* (2006.01)

(52) U.S. Cl. .................................................. 715/256

(58) Field of Classification Search .............. 715/234, 715/243, 254, 255, 256
See application file for complete search history.

(56) References Cited

U.S. PATENT DOCUMENTS

| 4,504,825 A * | 3/1985 | Bergermann et al. ......... 345/157 |
| 5,084,820 A | 1/1992 | Nagay et al. |
| 7,409,637 B2 | 8/2008 | Benzinger |

OTHER PUBLICATIONS

Wu et al., "A Fast Algorithm for Multi-Pattern Searching," May 1994, pp. 1-11.*

* cited by examiner

*Primary Examiner* — Kyle Stork
(74) *Attorney, Agent, or Firm* — Fish & Richardson P.C.

(57) ABSTRACT

A computer-implemented method of processing text. A method includes providing a unit of text to a text buffer. The unit of text is divided into one or more shift blocks and one or more replacement blocks. Based on a replacement operation of replacing each replacement block with replacement text, a final position of each shift-block within the text buffer is determined. A schedule for the replacement operation is then determined based at least in part on the final position of each shift block.

14 Claims, 3 Drawing Sheets

LEAST-EFFORT VARIABLE LENGTH TEXT REPLACEMENT

CROSS-REFERENCE TO RELATED APPLICATION

This application is a continuation of U.S. patent application Ser. No. 11/156,203, filed Jun. 17, 2005 and titled LEAST-EFFORT VARIABLE LENGTH TEXT REPLACEMENT, which application is hereby incorporated by reference in its entirety for all purposes.

BACKGROUND

In business software systems, a large-amount of data processing resources is spent on processing text. One particularly frequent operation is to substitute some text within a larger text file or document with other text. For example, in a customer list, such an operation could include substituting customer names for customer identification numbers. At, a technical level, this can be a very costly operation as actual characters that make up the text have to be shifted in memory in order to make space for replacement characters, or to close gaps if the replacement text is respectively longer or shorter than the text being replaced.

FIG. 1 shows an example of a text replacement operation. For the purpose of this document, a text string of N+1 characters will be referred to as t[0,N]. The subpart of t starting at position i and ending at position k is denoted by t[i,k]. Let t[0,N−1] be the text in which p parts t[m1,n1], . . . , t[mp,np] are to be replaced by text sequences r1, . . . , rp, respectively. Each replacement may be longer or shorter than the part being replaced.

In the example shown, five shaded parts t1[3,4], t1[9,11], t1[16,23], t1[25,26], and t1[29,29] in the text string t1[0,29] are to be replaced. The resultant text-string, t2[0,27] will include the five replaced parts shown as t2[3,8], t2[13,14], t2[19,19], t2[21,23], and t2[26,27], respectively. As an example, in order to replace the part t1[3,4] of text t1 with t2[3,8] of text t2, additional space has to be created in text string t1 by moving characters t1[5,29] to the right. Because of this shift, almost all of text t1 will have to be rebuilt to account for changes in length of the replace part, and rebuilt for each replacement step in the operation.

The conventional approach is to save t1 in spare storage, copy the replacements into t1, and restore the intermediate parts of t1 from storage. The conventional method, however, requires N bytes of additional storage and moves up to 2 N bytes, which may be very costly for large texts, or for a large number of such operations.

SUMMARY

The invention provides a system and method for efficiently replacing one or more parts of variable length text with arbitrary replacements so that each character in a text string is processed only once for the entire replacement operation.

In some embodiments, a method includes dividing the text into two types of blocks, i.e. blocks, to replace ("replacement blocks") and blocks to shift ("shift blocks"), and determining an optimal schedule for processing (i.e., replacing or shifting) each respective block. The schedule is generated to ensure that each block is shifted at most once, and that sufficient space is available for each shift block shifted and each replacement block inserted. Shifting each block only once ensures the efficiency ("least effort"), whereas providing sufficient space for shifting and replacing ensures the correctness of the method. The computation of the schedule is described in further detail below.

In accordance with embodiments, a computer-implemented method of processing text includes providing a unit of text to a text buffer. The method further includes dividing the unit of text into one or more shift blocks and one or more replacement blocks. Based on a replacement operation of replacing each replacement block with replacement text, a final position of each shift block within the text buffer is determined. The method further includes determining a schedule for the replacement operation based at least in part on the final position of each shift block.

In another aspect, a method further includes shifting each shift block to its final position in the text buffer according to the schedule. In yet another aspect, a method includes replacing each replacement block with the replacement text according to the schedule. In still yet another aspect, a step of determining a schedule for the replacement operation further includes the following algorithm:

determining, in the unit of text, a left-most shift block Su[mu,nu] that has not been processed and where nu'<nu, wherein each shift block S1, . . . , Sp are subparts t[n1+1,m2−1], . . . t[np+1,N−1] of the unit of text t; shifting each shift block and replacing each replacement block preceding the first shift block Su in the text buffer, from right to left, skipping already processed blocks; and repeating the determining and shifting until no further Su is determined.

Determining a schedule for the replacement operation can farther include shifting each shift block and replacing each replacement block in the text buffer that has not been processed.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for efficiently replacing one or more parts of a given unit of text by other text of variable length. In some embodiments, each variable-length text block is replaced with arbitrary replacement text blocks, so that each character in a text string is processed only once for the entire replacement operation. This approach requires moving at most N bytes, yielding a substantial cost improvement over conventional methods, and removing the need for additional storage. An example of where it is desirable for using least effort text replacement is text processing operations using a programming language such as ABAP Objects or the like.

In accordance with some embodiments, a unit of text is divided into two types of blocks, i.e. blocks to replace ("replacement blocks") and blocks to shift ("shift blocks"), and a schedule for processing (i.e., replacing or shifting) each respective block is determined, whereby each block is scheduled to be processed only once. Processing each block only once ensures the efficiency ("least effort"). The processing order of blocks ensures that sufficient space is available for shifting and replacing each block, i.e., no characters that are part of both original text and resultant text are overwritten during this process. The systems and methods, including the computation of the schedule are described in further detail below.

Figure 2:
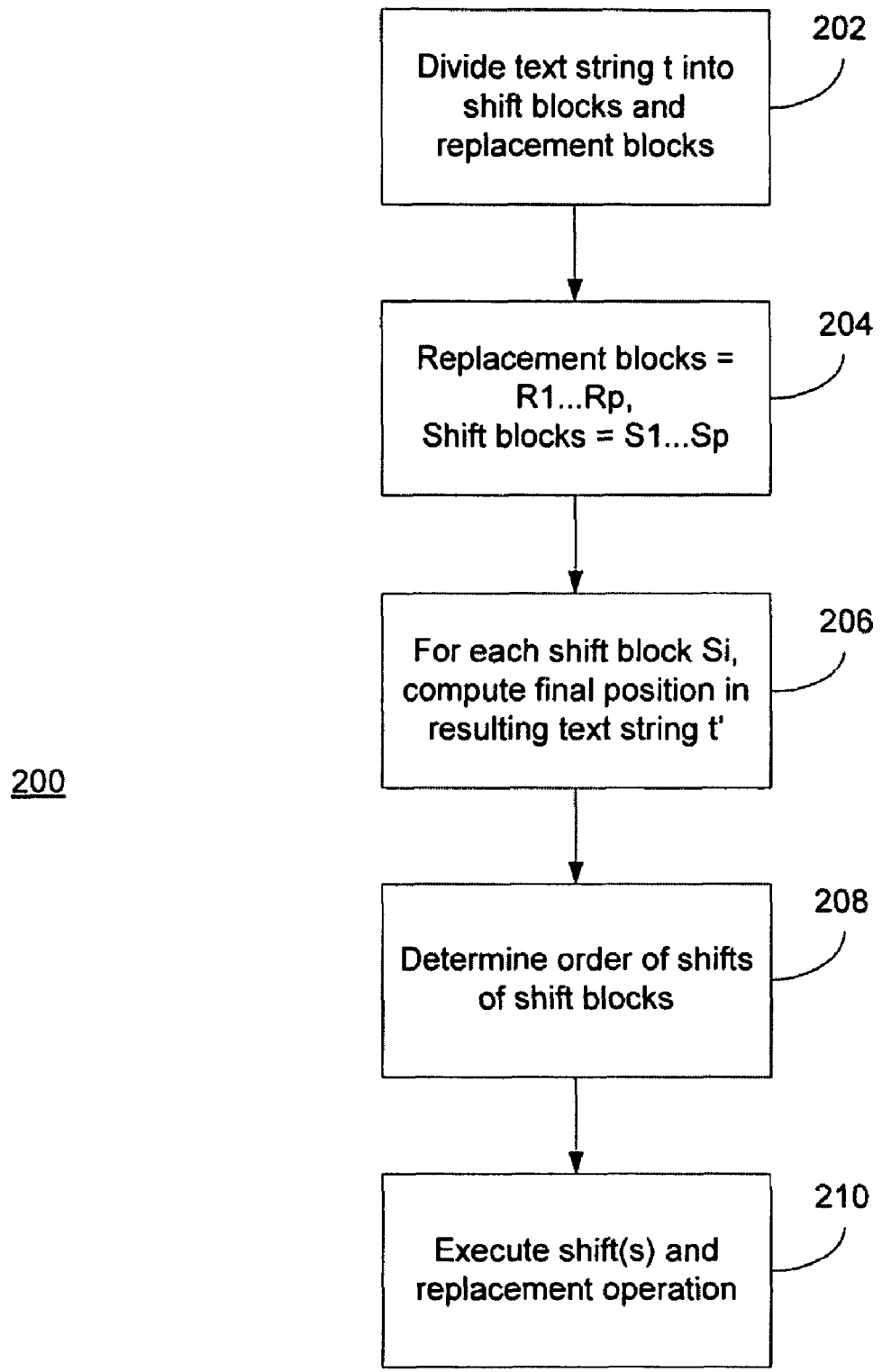
FIG. 2 is a flowchart of a least-effort, variable-length text replacement method.

FIG. 2 is a flowchart of a least-effort, variable-length text replacement method 200. At step 202, a unit of text t in a text buffer and made up of N characters is first divided into alternating shift blocks and replacement blocks. The replacement blocks can be represented as R1, . . . , Rp, which are the subparts t[m1,n1], . . . , t[mp,np] of the text string t. The shift blocks can be represented as S1, . . . , Sp, which are the subparts t[n1+1,n2−1], . . . , t[np+1,N−1] of the text t, as shown at step 204.

At step 206, for each shift block Si, a final position t'[m'i, n'i] in the resulting text t' is computed. The final position is computed to take into account all text replacements within one operation. Instead of saving tin storage, each shift block is moved within the text buffer to create space for the replacement blocks and to close gaps. There are, however, only a limited number of sequences in which shifts and replacements may be executed without data loss.

Figure 1:
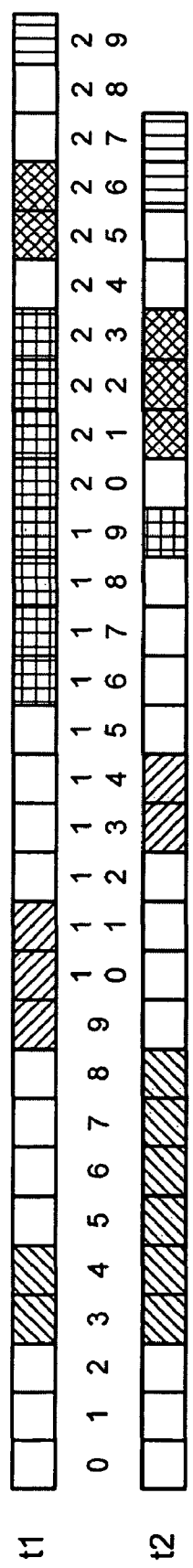
FIG. 1 illustrates a sample text replacement operation in which three text blocks are replaced by longer text blocks, and two text blocks are replaced by shorter text blocks.

The order of the shifts of shift blocks in the text buffer is determined at step 208. For example, referring again to FIG. 1, in order to shift block t1[5,8] to the right, block t1[12,15] needs to be shifted first, or character 12 of t1 will be overwritten. Similarly, block t1[24,24] needs to be shifted left prior to block t1[27,28], or character 24 will be overwritten. A correct replacement schedule would thus shift blocks 3, 2, 1, and finally 4. At step 210, the shifts are executed in the determined order, and the replacement operation is performed.

Figure 3:
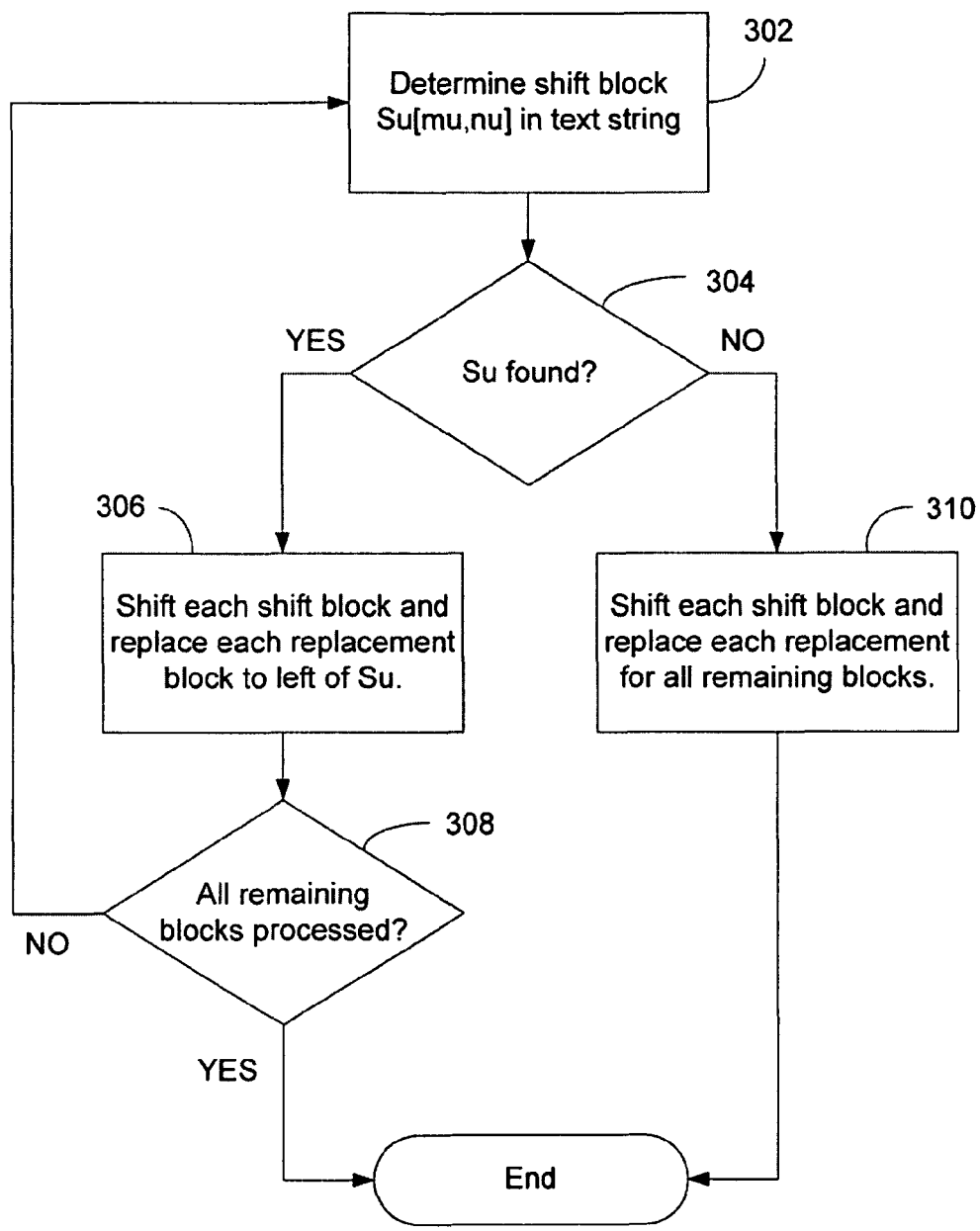
FIG. 3 is a flowchart of a method for determining a replacement schedule for a text replacement operation.

With reference to FIG. 3, a method 300 for determining a replacement schedule is described. At step 302, starting from the left of a unit of text and moving to the right, the first shift block Su[mu,nu] whose right end point will be moved to the left (i.e. nu'<nu) is determined. At step 304, it is determined whether Su exists in the text string. If so, at step 306, from the shift block Su and proceeding to the left, each shift block is shifted and each replacement block is replaced until all blocks to the left of Su have been processed.

Steps 302 and 306 are then repeated, restarting at shift block S(u+1). At block 308 it is determined whether all blocks have been processed. If not, the method 300 continues at step 302, and if so, the method 300 ends. If there is no block Su determined at step 304, at step 310 each shift block is shifted and each replacement block is replaced until all remaining blocks have been processed, determined at block 306. After all remaining blocks are processed, the method 300 ends.

Each block is handled at most once, and therefore no more than N bytes are moved in a given operation. The resulting text t' produced by the above-described methods is the text t with each part t[mi,ni] replaced by its corresponding replacement text Ri. The replacement schedule guarantees that (i) each character of t' is moved at most once, minimizing the cost required for executing the operation and computing t', and (ii) sufficient space is available for processing each block, i.e., no characters of t that are also part of resultant text t' are overwritten during this process.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method of replacing at least a part of a text with another text, the method comprising:
   providing a unit of text to a text buffer, the unit of text having a total number of characters;
   dividing the unit of text into subsets comprising a plurality of shift blocks and one or more replacement blocks, the one or more replacement blocks being replaceable by a respective replacement text of variable length, wherein:

the plurality of shift blocks has a first number of shift characters, the one or more replacement blocks have a second number of replacement characters, and a sum of the first number and the second number equals the total number;

based on one operation of replacing each replacement block with the respective replacement text, determining a final position of each shift block within the text buffer such that all of the plurality of shift blocks are processable in the one operation;

determining an order of shifting the plurality shift blocks in the one operation based at least in part on the final position of each shift block; and in the one operation, shifting each shift block of the plurality of shift blocks and replacing the one or more replacement blocks with the respective replacement text to provide a text string having a length based on the first number of shift characters and the variable length of the respective replacement text.

2. A method in accordance with claim 1, wherein shifting each shift block of the plurality of shift blocks and replacing the one or more replacement blocks in the one operation comprises shifting each shift block to its final position in the text buffer according to the order.

3. A method in accordance with claim 2, wherein shifting each shift block of the plurality of shift blocks and replacing the one or more replacement blocks in the one operation further comprises replacing each replacement block with the respective replacement text according to the order and whether at least one shift block remains unprocessed within the unit of text.

4. A method in accordance with claim 3, wherein shifting each shift block of the plurality of shift blocks and replacing the one or more replacement blocks in the one operation further comprises:

determining, in the unit of text, a left-most shift block that has not been processed; and replacing each replacement block preceding a first shift block in the text buffer, from right to left, skipping any shift blocks and any replacement blocks that have already been processed.

5. A computer-implemented method of replacing at least a part of a unit of text in a text buffer with another text, the unit of text having a total number of characters, the method comprising:

dividing the unit of text into subsets comprising a plurality of shift blocks and one or more replacement blocks, the one or more replacement blocks being replaceable by a respective replacement text of variable length, wherein:

the plurality of shift blocks has a first number of shift characters, the one or more replacement blocks have a second number of replacement characters, and a sum of the first number and the second number equals the total number;

based on one operation of replacing each replacement block with the respective replacement text, determining a final position of each shift block within the text buffer such that all of the plurality of shift blocks are processable in the one operation;

determining an order of shifting the plurality of shift blocks in the one operation based at least in part on the final position of each shift block; and in the one operation, shifting each shift block of the plurality of shift blocks and replacing the one or more replacement blocks with the respective replacement text to provide a text string having a length based on the first number of shift characters and the variable length of the respective replacement text.

6. A method in accordance with claim 5, wherein shifting each shift block of the plurality of shift blocks and replacing the one or more replacement blocks in the one operation comprises shifting each shift block to its final position in the text buffer according to the order.

7. A method in accordance with claim 6, wherein shifting each shift block of the plurality of shift blocks and replacing the one or more replacement blocks in the one operation further comprises replacing each replacement block with the respective replacement text according to the order and whether at least one shift block remains unprocessed within the unit of text.

8. A method in accordance with claim 7, wherein shifting each shift block of the plurality of shift blocks and replacing the one or more replacement blocks in the one operation further comprises:

determining, in the unit of text, a left-most shift block that has not been processed; and replacing each replacement block preceding a first shift block in the text buffer, from right to left, skipping any shift blocks and any replacement blocks that have already been processed.

9. A computer-implemented method of replacing at least a part of a unit of text in a text buffer with another text, wherein the unit of text is divided into subsets comprising a plurality of shift blocks and one or more replacement blocks, the one or more replacement blocks being replaceable by a respective replacement text of variable length, the method comprising:

based on one operation of replacing each replacement block with the respective replacement text, determining a final position of each shift block within the text buffer such that all of the plurality of shift blocks are processable in the one operation;

determining an order of shifting the plurality of shift blocks in the one operation based at least in part on the final position of each shift block; and in the one operation, shifting each shift block of the plurality of shift blocks and replacing the one or more replacement blocks with the respective replacement text to provide a text string having a length based on the first number of shift characters and the variable length of the respective replacement text.

10. A method in accordance with claim 9, wherein shifting each shift block of the plurality of shift blocks and replacing the one or more replacement blocks in the one operation comprises shifting each shift block to its final position in the text buffer according to the order.

11. A method in accordance with claim 9, wherein shifting each shift block of the plurality of shift blocks and replacing the one or more replacement blocks in the one operation further comprises replacing each replacement block with the respective replacement text according to the order and whether at least one shift block remains unprocessed within the unit of text.

12. A method in accordance with claim 11, wherein shifting each shift block of the plurality of shift blocks and replacing the one or more replacement blocks in the one operation further comprises determining an order in which each replacement block is replaced with the replacement text.

13. A method in accordance with claim 12, wherein shifting each shift block of the plurality of shift blocks and replacing the one or more replacement blocks in the one operation further comprises:
- determining, in the unit of text, a left-most shift block that has not been processed; and
- replacing each replacement block preceding a first shift block in the text buffer, from right to left, skipping any shift blocks and any replacement blocks that have already been processed.

14. A method in accordance with claim 13, wherein:
- the unit of text has a total number of characters;
- the plurality of shift blocks has a first number of shift characters;
- the one or more replacement blocks have a second number of replacement characters; and
- a sum of the first number and the second number equals the total number.

* * * * *